W. L. WALL.
OPHTHALMIC MOUNTING.
APPLICATION FILED APR. 15, 1920.
1,360,603. Patented Nov. 30, 1920.
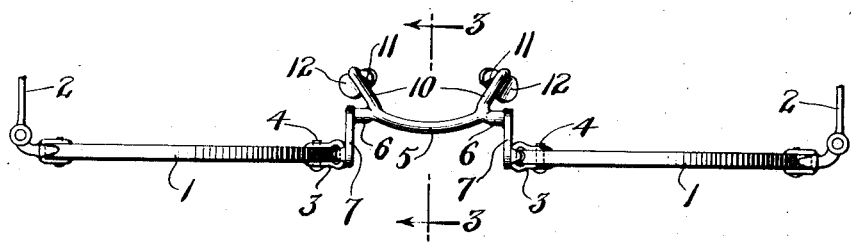
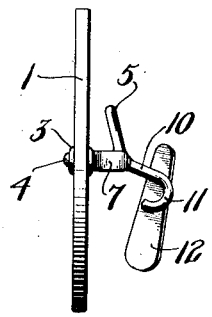
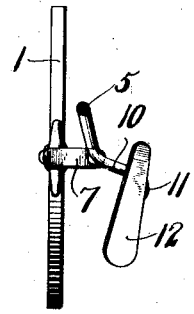
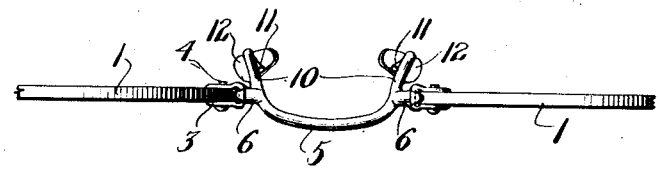
WITNESS.
Gustav Genzlinger.
INVENTOR.
William L. Wall
BY
Cyrus N. Anderson
ATTORNEY

UNITED STATES PATENT OFFICE.

WILLIAM L. WALL, OF PHILADELPHIA, PENNSYLVANIA, ASSIGNOR TO WALL & OCHS, INCORPORATED, OF PHILADELPHIA, PENNSYLVANIA, A CORPORATION OF PENNSYLVANIA.

OPHTHALMIC MOUNTING.

1,360,603.   Specification of Letters Patent.   Patented Nov. 30, 1920.

Application filed April 15, 1920. Serial No. 374,016.

*To all whom it may concern:*

Be it known that I, WILLIAM L. WALL, a citizen of the United States, and a resident of Philadelphia, in the county of Philadelphia and State of Pennsylvania have invented an Improvement in Ophthalmic Mountings, of which the following is a specification.

One objection to spectacles is that the bridge which connects the lenses rests upon the nose and form therein and transversely thereof a deep crease which, after glasses have been worn by a person for a long period of time, becomes so deep and fixed that it requires a long period of time, in case one discontinues the wearing of glasses, for the same to disappear. Furthermore in the case of many persons wearing spectacles it is found that the bridge resting upon the nose and bearing the weight of the glasses and the mountings thereon abrades and cuts the skin so as to form a sore place.

One of the objects of my invention is to provide a spectacle construction in which the bridge conforms to the shape of the nose but is supported out of contact therewith, or at least out of supporting contact therewith, by nose pad supports which are mounted upon arms extending rearwardly from the opposite end portions of the bridge and which rest upon opposite sides of the nose and support the spectacles as in the case of ordinary nose glasses in which the glasses are held in position upon the nose by nose gripping members.

A further object of my invention is to provide a construction of the character stated in which the arms upon which the pads are supported are provided intermediate their ends with bends, the bend in each arm extending in a general vertical direction more or less in the direction of the length of the pad supported by such arm, whereby when the nose pads have once been comfortably positioned upon the opposite sides of the nose in such positions thereon as they naturally assume by reason of or due to any particular or peculiar anatomical structure thereof they may be allowed to remain in such positions and the glasses vertically adjusted with respect to the eyes merely by manipulating the bends in the rearwardly extending arms upon which the nose pads are supported.

A further object of my invention is to provide a construction whereby the lenses may be off-set with respect to the opposite ends of the bridge in order to place them far enough forward to prevent contact therewith by the ends of eyelashes which may be longer than normal or usual.

Other objects and advantages of my invention will be pointed out in the detailed description thereof which follows or will be apparent from such description.

In order that the invention may be readily understood and its practical advantages fully appreciated, reference may be had to the accompanying drawing in which I have illustrated certain embodiments thereof. It will be understood, however, that changes in the details of construction may be made within the scope of the claims without departing from the said invention.

In the drawing:

Figure 1 is a top plan view of a pair of spectacles provided with a mounting constructed in accordance with my invention;

Fig. 2 is an end elevation thereof the temple lug and temple wire being omitted;

Fig. 3 is a transverse sectional view taken on the line 3—3 of Fig. 1; and

Fig. 4 is a top plan view showing a slight modification of the construction.

Referring to the drawing: 1 designates the lenses of a pair of eyeglasses and 2 the temple wires connected therewith. At their opposing inner edges straps 3 are provided which are connected to the lenses by means of the screws 4 in known manner.

5 designates the bridge extending between the lenses the opposite ends of which are connected to short posts 6 which in Figs. 1 to 3 of the drawing are secured to the rear ends of rearwardly extending arms 7, the forward ends of which are connected to the straps 3. By providing these rearwardly extending arms 7 the lenses may be positioned a sufficient distance in front of the eyes to avoid contact therewith of the eyelashes which in case of long lashes may become very annoying. It is important in such cases that means be provided whereby the lenses can be positioned sufficiently far in front of the eyes to avoid such contact.

In the construction shown in Fig. 4 of the drawing the posts 6 are connected directly to the straps 3 and extend inwardly therefrom in the same plane as that of the lenses of the spectacles. In both forms of construction the opposite end portions of the bridge 5 are extended rearwardly, forming arms which are inclined slightly downwardly as indicated at 10 and are then bent sharply downwardly and forwardly to form the bends 11 as shown. The nose pads or rests 12 are secured to the inner sides of the forwardly extending portions of these bends, as is clearly shown in the drawing. Although the bends 11 are formed by bending the rear end portions of the extensions of the opposite ends of the bridge downwardly and forwardly, it will of course be understood that many of the advantages of my invention may be obtained by bending the rear end portions of such extensions in opposite directions; that is, upwardly and then forwardly.

In the fitting of spectacles and eyeglasses it is desirable and practically necessary that the lenses shall occupy positions directly in front of and properly centered with respect to the eyes, and, as is well known, it not infrequently happens that the optical center or center of one eye is nearer to a vertical plane extending medially of the nose than is the optical center or center of the other eye. In such cases it is of course desirable that the lenses occupy positions with respect to such medial plane corresponding to the positions of the eyes respectively. In order to effect such positioning of the lenses the posts 6 may be constructed of different lengths, the difference between their lengths varying as may be required to properly position the lenses with respect to the center of the eyes.

In the construction as shown in Figs. 1 to 3 the same result may be accomplished, even though the posts 6 at the opposite ends of the bridge may be of the same length, by bending and adjusting the arms 7. It is apparent that either of these arms may be adjusted so as to vary the distance of the lens supported thereby with respect to the medial vertical plane of the nose previously referred to.

In the fitting of spectacles provided with mountings embodying my invention, the nose pads are first comfortably positioned upon the nose, the said pads assuming and taking positions thereon corresponding to and in accordance with the anatomical structure and conformation thereof. When these pads have been thus comfortably positioned the lenses of the spectacles are then adjusted with respect to the eyes by adjusting the bends in the rearward extensions from the opposite end portions of the bridge. By adjusting these bends the lenses may be raised or lowered with respect to the eyes and also the angular relation of the lenses with respect to the eyes may be adjusted to meet the requirements of different wearers.

It will be seen that by my construction I have not only provided means whereby the lenses of a pair of spectacles may be properly adjusted with respect to the eyes but I have also provided a construction in which the spectacles are supported by means of pads which contact with opposite sides of the nose and in which the bridge, while bent or curved to conform to the shape of the nose, is not permitted to rest thereon, particularly the crest portion thereof, thereby avoiding the formation therein of a deep transverse crease or line which to some wearers is very objectionable and in some cases is painful as well.

In the construction as shown it will be noted that the opposite end portions of the bridge 5 are connected integrally with the posts 6 and with the straps 3, and also that the extensions 10 are likewise integral with the bridge 5 and with the posts 6, but it will be understood that any other suitable form of connection between these various parts or elements may be employed.

I claim:

1. An ophthalmic mounting comprising a bridge for connecting the lenses of a pair of spectacles, arms extending rearwardly from the opposite end portions of the said bridge, said arms each being provided with a bend therein whereby the end portions of said arms extend forwardly, and nose pads connected at points intermediate their ends to the inner sides of the end portions of said bends, the said bends occupying planes extending in the general direction of the length of the said pads.

2. An ophthalmic mounting for spectacles comprising a bridge having connection at its opposite ends to the lenses of said spectacles, the opposite ends of said bridge being provided with extensions which extend rearwardly and to the ends of which nose bearing pads are secured at points intermediate their ends, the said extensions being provided with bends intermediate their ends, which bends occupy planes extending in the general direction of the length of the said pads.

3. An ophthalmic mounting for spectacles comprising a rigid bridge having connection at its opposite ends to the lenses of said spectacles, said bridge being provided with rearward extensions which extensions are bent downwardly and then forwardly so that the end portions thereof extend in a forward direction, and nose pads secured at points intermediate their ends to the ends of said extensions.

4. An ophthalmic mounting for spectacles comprising a bridge and means for connecting the opposite ends of said bridge to the lenses of said spectacles, arms having connection with the opposite ends of the said bridge and extending rearwardly therefrom and being provided with bends therein whereby the ends of said arms project forwardly, nose pads secured upon their outer sides to the forwardly projecting ends of said arms and the bends in the said arms occupying planes extending in the general direction of the length of the said pads.

5. An ophthalmic mounting for spectacles comprising a bridge, means for connecting the opposite ends of said bridge to the said lenses and the said bridge being provided with integral rearwardly extending projections at its opposite ends which projections are inclined slightly downwardly for a portion of their length and are then bent sharply downwardly and then forwardly so that the end portions thereof project in a forward direction, and nose pads secured at points upon their outer sides to the forwardly projecting portions of the said extensions.

6. An ophthalmic mounting for spectacles comprising a bridge, means integral therewith for connecting the opposite ends of said bridge to the lenses of said spectacles, arms integral with the said bridge which arms extend rearwardly, the rear end portions thereof being bent downwardly and then forwardly, the said bends occupying planes extending in a general vertical direction, and nose pads secured to the forwardly projecting portions of said bends, said pads being situated upon the inner sides of the said bends, substantially as described.

7. An ophthalmic mounting for spectacles comprising a bridge of a shape to conform to the convexity of the nose, means for connecting the opposite ends of said bridge to the lenses of said spectacles, arms having connection with the opposite end portions of the said bridge and extending rearwardly and outwardly therefrom, nose pads secured at points intermediate their ends to the end portions of said arms, the said arms comprising means whereby when the said pads have been seated in the positions desired upon the nose the remaining portion of the mounting and the lenses supported thereby may be adjusted vertically with respect to the eyes without changing the positions of the said nose pads.

8. An ophthalmic mounting for spectacles comprising a bridge, arms extending forwardly from the opposite ends of said bridge, means for connecting the forward ends of said arms to the lenses, arms extending rearwardly from opposite end portions of said bridge and away from the rear ends of said first named arms, and nose pads secured upon the end portions of said arms.

In testimony that I claim the foregoing as my invention I have hereunto signed my name this 6th day of April, A. D. 1920.

WILLIAM L. WALL